Nov. 7, 1950  H. E. MENSER  2,529,171
METAL CUTTING SHEARS
Filed Jan. 27, 1948
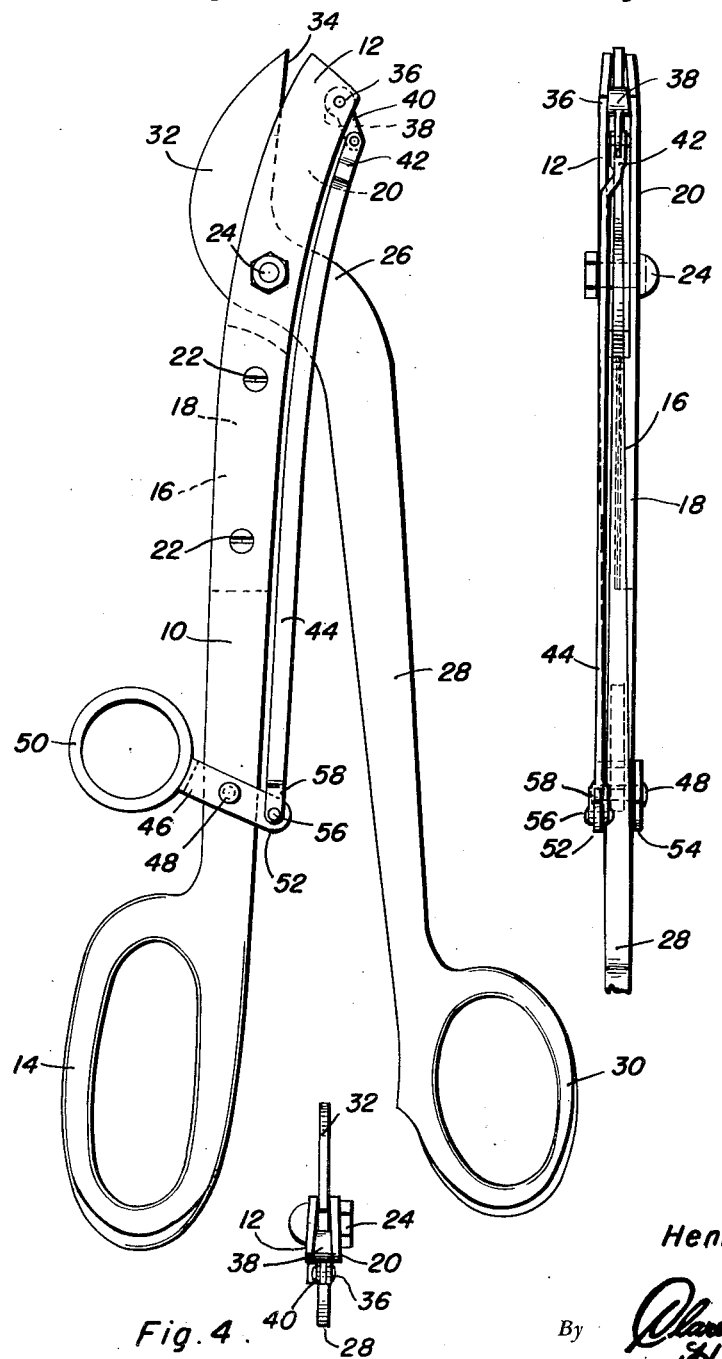
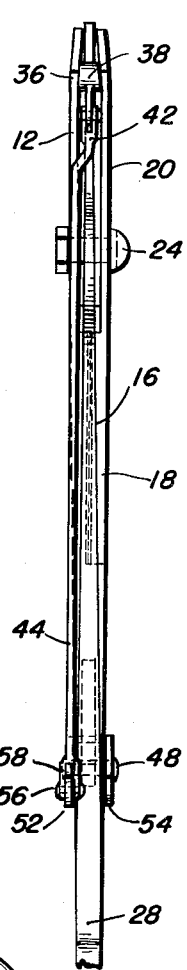
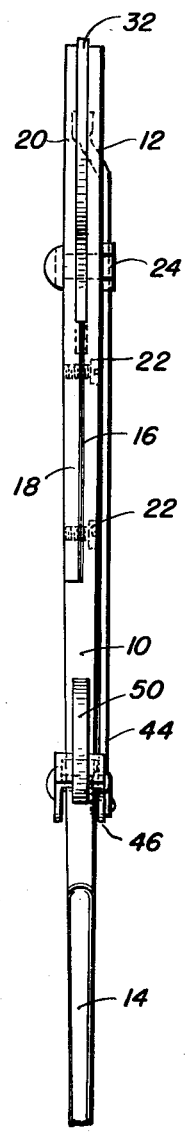
Inventor
Henry E. Menser
By Clarence A. O'Brien
and Harvey B. Jacobson
Attorneys Patented Nov. 7, 1950

2,529,171

UNITED STATES PATENT OFFICE 2,529,171

METAL-CUTTING SHEARS

Henry E. Menser, Crofton, Ky., assignor of thirty-three and one-third per cent to Charlie Huddleston, St. Charles, Ky.

Application January 27, 1948, Serial No. 4,661

5 Claims. (Cl. 30—258)

This invention relates to new and useful improvements in metal cutting shears and the primary object of the present invention is to provide a pair of metal cutting shears including novel and improved means for preventing the strip cut by the shears from becoming twisted or from binding in the shears to effect the normal cutting operation thereof.

Another important object of the present invention is to provide a pair of metal cutting shears including a pair of spaced fixed jaws, a movable cutter pivoted between said fixed jaws, and novel and improved means for spreading the fixed jaws to release a strip of metal that is twisted between the fixed jaws.

A further object of the present invention is to provide a pair of metal cutting shears including the aforementioned structure, and a conveniently accessible lever carried by the fixed portion thereof which is quickly and readily actuated for selective spreading of the fixed jaws.

A still further aim of the present invention is to provide a pair of metal snips that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is an elevational view of a pair of shears constructed in accordance with the present invention;

Figure 2 is a side elevational view of Figure 1, and with parts thereof broken away;

Figure 3 is a side elevational view of Figure 1, taken from the opposite side thereof than Figure 2, and with parts broken away; and Figure 4 is an end view of Figure 2.

Referring now to the drawings in detail, wherein for the purpose of illustration, there is disclosed a preferred embodiment of the present invention, the numeral 10 represents a fixed shank or handle terminating in a jaw 12 at one end and an enlarged finger receiving grip 14 at its opposite end. A recess 16 is provided in one side of the handle 10 adjacent the jaw 12, and engages the shank portion 18 of a complemental jaw 20. The shank portion 18 is secured to the handle by removable fasteners 22, that are preferably countersunk in the handle 10. The jaw 20 is normally spaced parallel to the jaw 12.

A removable shaft or pivot 24 is carried by the jaws 12 and 20 and pivotally supports the arcuate end portion 26 of a movable shank or handle 28, which is provided at one end with a finger receiving ring 30 and at its opposite end with an arcuate cutting member 32 that is movable into and out of position between the jaws 12 and 20. This cutting member 32 is provided with a relatively straight cutting edge 34.

Pivoted as at 36 between the jaws 12 and 20, is a cam or spreader 38 that is provided with an outwardly projecting ear 40 which is pivoted to the forward bifurcated end 42 of an actuating lever or link 44.

The numeral 46 represents a yoke that is pivoted as at 48 on the fixed handle 10, and which is provided with a finger engaging ring 50 projecting outwardly from its web portion. The free ends 52 and 54 of this yoke project outwardly from the opposite side of the handle 10 and are connected by a pivot pin 56. One of these ends, for example end 52, engages the rear bifurcated end 58 of link 44 which is pivoted on the pin 56 and on opposite sides of the end 52.

In practical use of the device, the finger engaging ring 50 is pushed forwardly, so that the cam 38 is in a normal position and the jaws 12 and 20 are spaced parallel. When in this position, the handles may be actuated so that the cutting member will cut sheets of metal disposed between the cutting member 32 and the lower edges of the jaws 12 and 20. Should the strip cut by the cutter 32 become twisted or bind between the jaws 12 and 20, the finger engaging ring 50 is pulled rearwardly which pivots the cam between the jaws 12 and 20 to spread the same, whereby the strip of metal that is twisted between the jaws may be removed therefrom in a convenient manner.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having thus described the invention, what is claimed as new is:

1. Metal cutting shears comprising a fixed shank bifurcated at one end, a movable shank pivoted at one end between the bifurcated end of said fixed shank, a cutting member carried by said movable shank for movement into and out of position in the bifurcated end of said fixed shank, means positioned between the furcations of said bifurcated end for spreading the furcations of said fixed shank, and means carried by one of said shanks for actuating said spreading means, said actuating means including a lever pivoted on said fixed shank and having a finger grip.

2. The combination of claim 1 wherein said actuating means includes a yoke pivoted on said fixed shank, a finger grip carried by said yoke and a link connecting said yoke to said spreading means.

3. The combination of claim 2 wherein said spreading means includes a rotatable cam.

4. Metal cutting shears comprising a fixed shank having a bifurcated terminal, a movable shank pivoted at one end between the bifurcated terminal of said fixed shank, a cutting member carried by said movable shank for movement into and out of position in the bifurcated terminal of said fixed shank, a cam pivoted between the furcations of the bifurcated terminal for spreading the furcations to prevent a strip of metal cut by the cutting member from binding between the furcations, and means carried by one of the shanks for pivoting the cam to spread the furcations.

5. The combination of claim 4 wherein said last mentioned means includes a finger actuated lever pivoted to said fixed shank, and a pusher link extending longitudinally of said fixed shank and having its ends pivoted to said cam and said lever respectively.

HENRY E. MENSER.

REFERENCES CITED

The following references are of record in the file of this patent:

UNITED STATES PATENTS

| Number | Name | Date |
|---|---|---|
| 1,201,106 | Shuter | Oct. 10, 1916 |